United States Patent
Lepola et al.

(10) Patent No.: US 7,527,076 B2
(45) Date of Patent: May 5, 2009

(54) VERTICAL PIPE LINING METHOD AND SYSTEM

(75) Inventors: William Lepola, Magnolia, TX (US); Kenton L Knoppel, Houston, TX (US)

(73) Assignee: Energy Maintenance Service Group I LLC, Houston, TX (US)

( * ) Notice: Subject to any disclaimer, the term of this patent is extended or adjusted under 35 U.S.C. 154(b) by 0 days.

(21) Appl. No.: 11/334,578

(22) Filed: Jan. 18, 2006

(65) Prior Publication Data
US 2007/0163665 A1    Jul. 19, 2007

(51) Int. Cl.
    *F16L 55/16* (2006.01)
(52) U.S. Cl. .......................... 138/98; 138/97; 264/269; 264/36; 156/294; 156/287
(58) Field of Classification Search .................. 138/98, 138/97; 156/287, 294; 405/150.1; 264/267
See application file for complete search history.

(56) References Cited

U.S. PATENT DOCUMENTS

| | | | |
|---|---|---|---|
| 4,861,634 A | | 8/1989 | Renaud |
| 5,010,440 A | * | 4/1991 | Endo ........................ 361/215 |
| 5,393,481 A | * | 2/1995 | Wood ........................ 264/516 |
| 5,439,033 A | * | 8/1995 | Kamiyama et al. ............ 138/98 |
| 5,566,719 A | * | 10/1996 | Kamiyama et al. ............ 138/98 |
| 5,606,997 A | * | 3/1997 | Blackmore et al. ............ 138/98 |
| 5,765,597 A | * | 6/1998 | Kiest, Jr. et al. .............. 138/98 |
| 6,152,184 A | * | 11/2000 | Kamiyama et al. ............ 138/98 |
| 6,708,728 B2 | * | 3/2004 | Driver et al. .................. 138/98 |
| 6,942,426 B1 | * | 9/2005 | Kampbell et al. ......... 405/184.2 |
| 6,960,313 B2 | * | 11/2005 | Waring et al. ............ 264/36.17 |

* cited by examiner

*Primary Examiner*—Patrick F Brinson
(74) *Attorney, Agent, or Firm*—Law Office of David McEwing

(57) ABSTRACT

The invention discloses a vertical pipe lining method comprising placing a repair material having a first end and a second end into a pipe having a bottom opening and a top opening. The repair material is inflated to press the repair material against the inside wall surface of the pipe; and heated air is conveyed through the inflated repair material from the bottom opening to the top opening to cure or mold a thermal responsive component of the repair material to the pipe. The invention also teaches a repair material for vertically oriented pipes comprising a multi-layered lining comprising a first outer layer and a second inner layer wherein the first outer layer comprises a resin impregnated fiber and the second inner layer is air impermeable. The invention also teaches a system for repairing. vertical pipe utilizing a repair material inflation device, an air blower and an air heater.

8 Claims, 13 Drawing Sheets

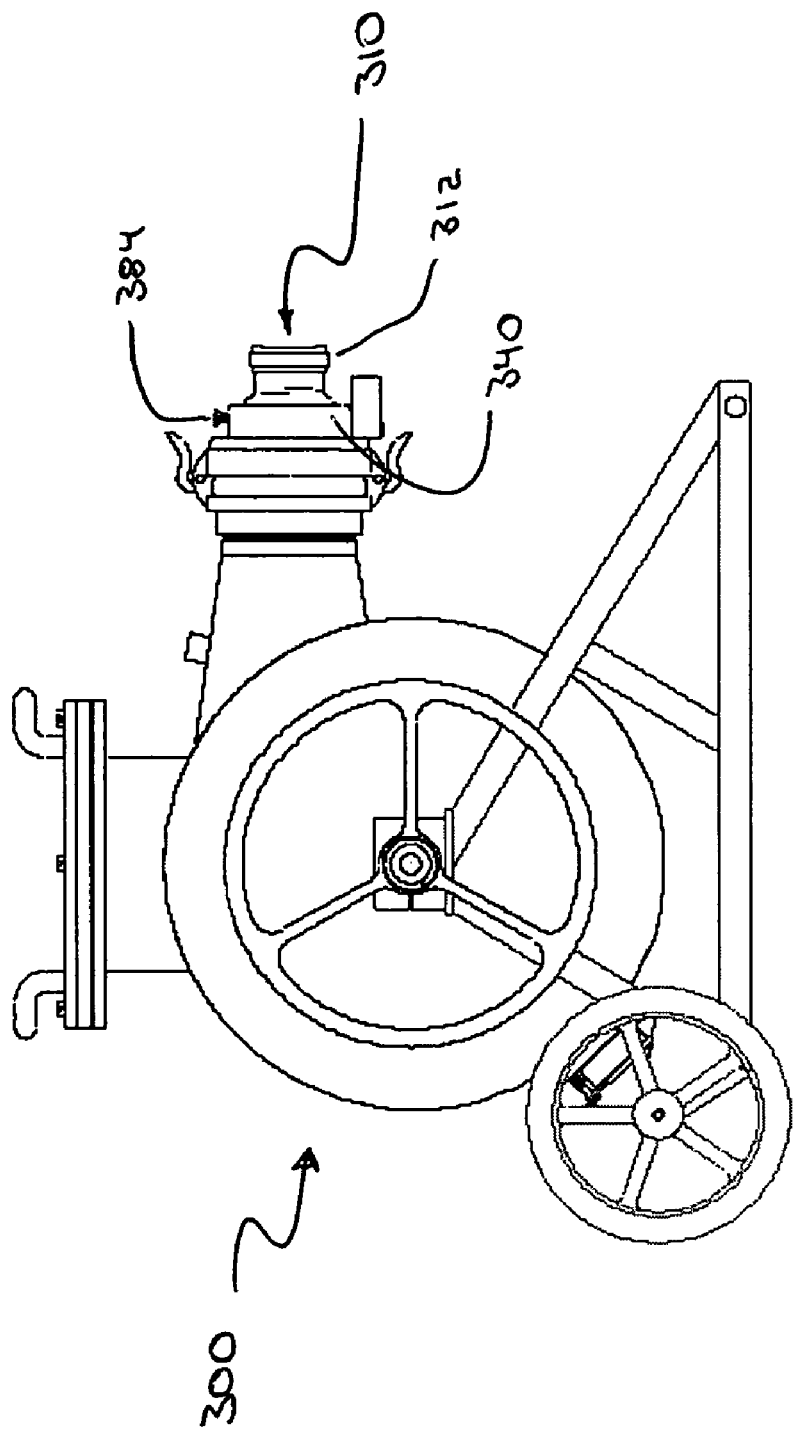

see Fig 2C

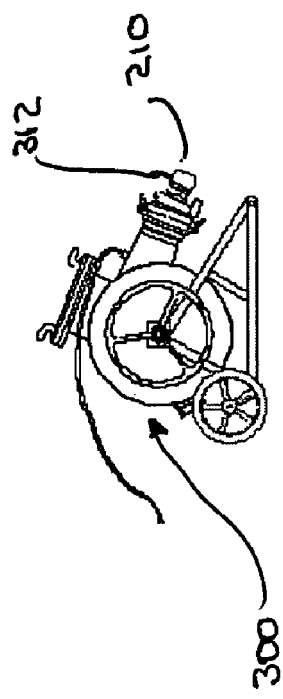
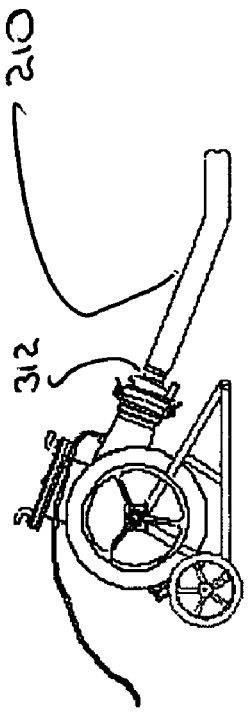
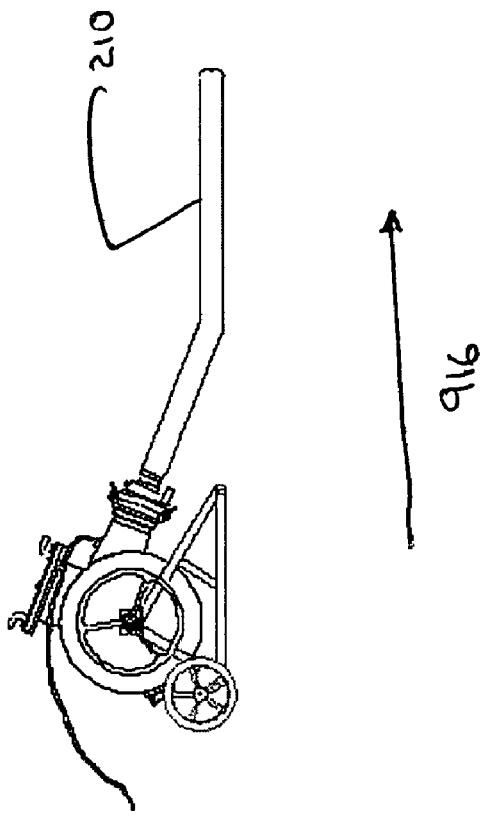
FIG 3A
FIG 3B
FIG 3C

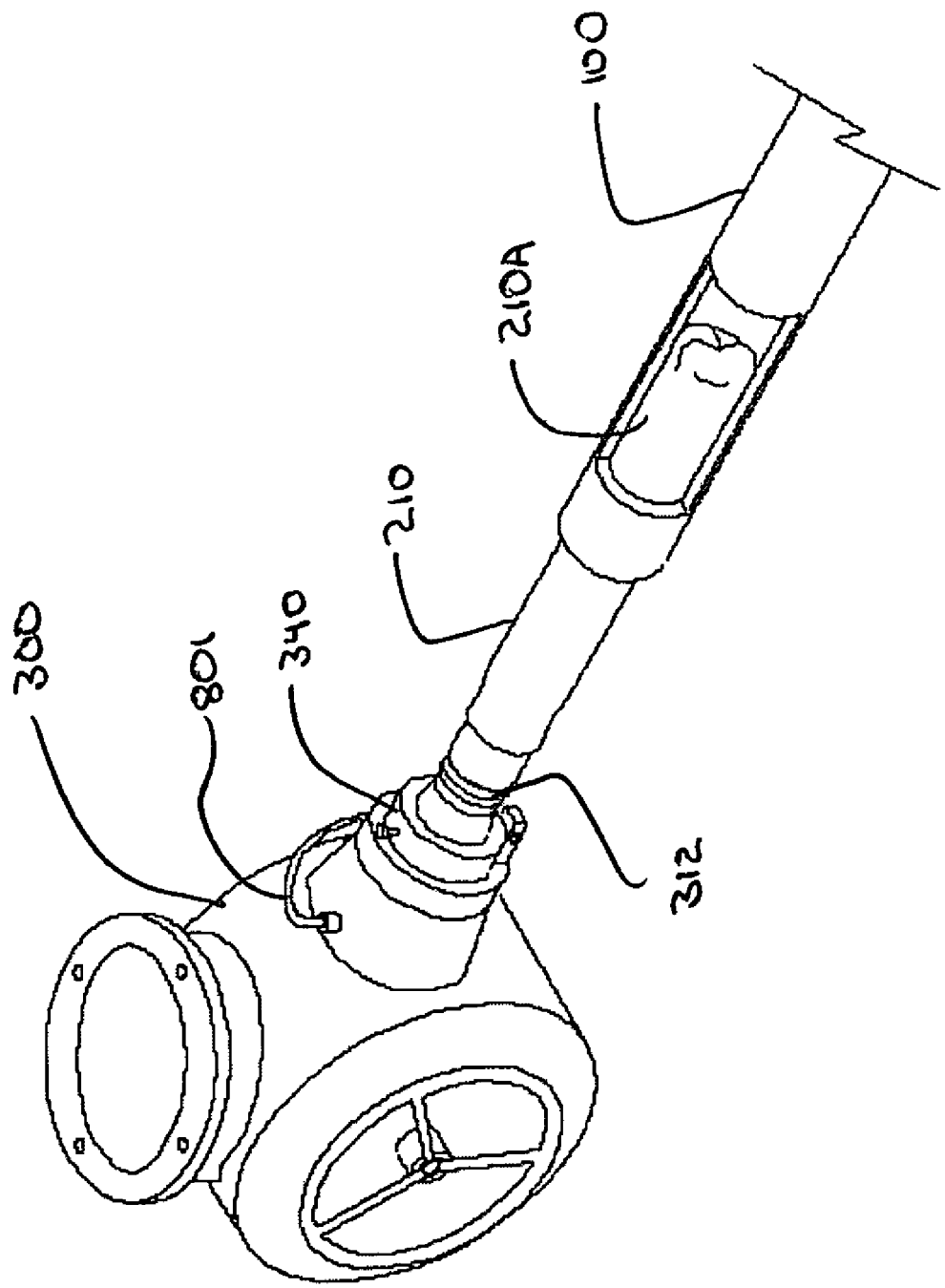

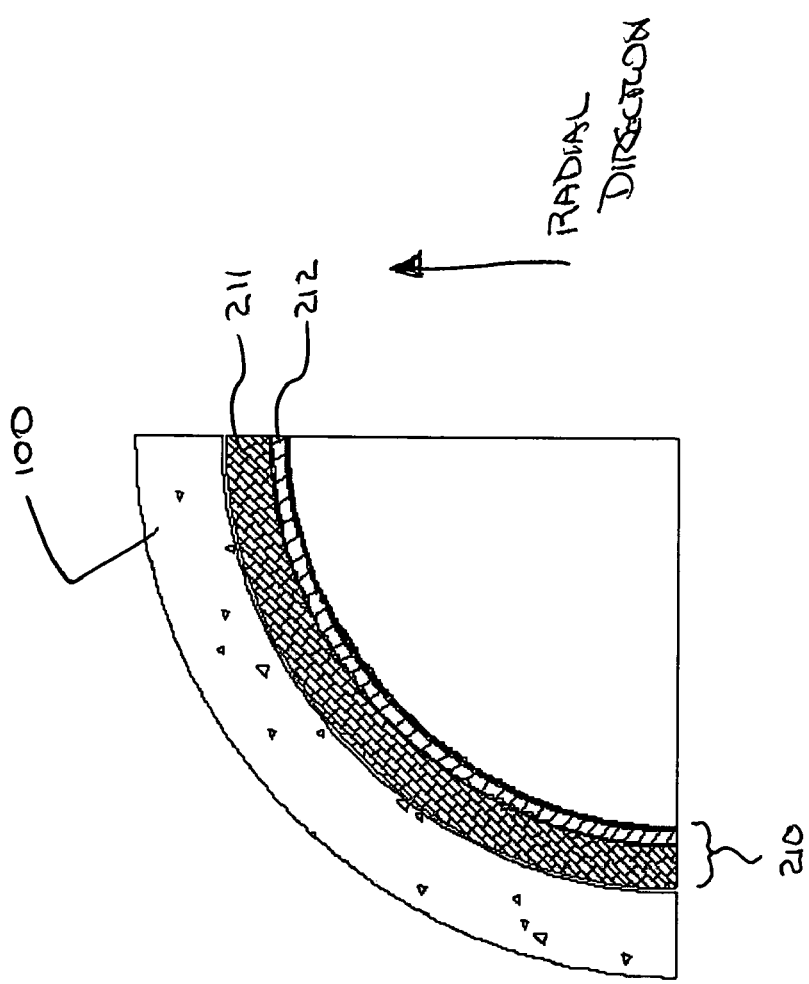

VERTICAL PIPE LINING METHOD AND SYSTEM

BACKGROUND OF INVENTION

1. Field of Invention

The present invention generally relates to a method for in situ lining of pipes, conduits or ducts having substantially vertical orientation. The invention further relates to a system of devices utilized in this method of pipe lining.

2. Description of Related Art

The invention pertains to the field of pipe or conduit repair. An example is installing a lining to the interior surface of a substantially vertically oriented pipe such as a roof drain pipe or waste drain stack. Such pipes are typically found within the enclosed walls of a building.

BRIEF SUMMARY OF THE INVENTION

The invention discloses a vertical pipe lining method comprising placing a repair material having a first end and a second end into a pipe having a bottom opening and a top opening. The repair material is inflated to press the repair material against the inside wall surface of the pipe; and heated air is conveyed through the inflated repair material from the bottom opening to the top opening to cure or mold a thermal responsive component of the repair material to the pipe.

The invention also teaches a repair material for vertically oriented pipes comprising a multi-layered lining comprising a first outer layer and a second inner layer wherein the first outer layer comprises a resin impregnated fiber and the second inner layer is air impermeable.

BRIEF SUMMARY OF DRAWINGS

The accompanying drawings, which are incorporated in and constitute a part of the specification, illustrate embodiments of the invention. These drawings, together with the general description of the invention given above and the detailed description of the embodiments given below, serve to explain the principles of the invention.

FIG. 2A illustrates a side view of an inflation canister used in one embodiment of the invention for deploying the repair material into the pipe using air pressure.

FIGS. 3A, 3B and 3C sequentially illustrate the eversion of the repair material from the inflation canister through the deployment port.

FIG. 3E is a perspective view of the repair material everting from the inflation canister and into a pipe.

FIG. 4 illustrates a cross sectional view of a pipe wall and the position of the repair material. The repair material illustrated comprises two parts; a resin impregnated layer and an air impermeable layer.

DETAILED DESCRIPTION OF INVENTION

Figure 1:
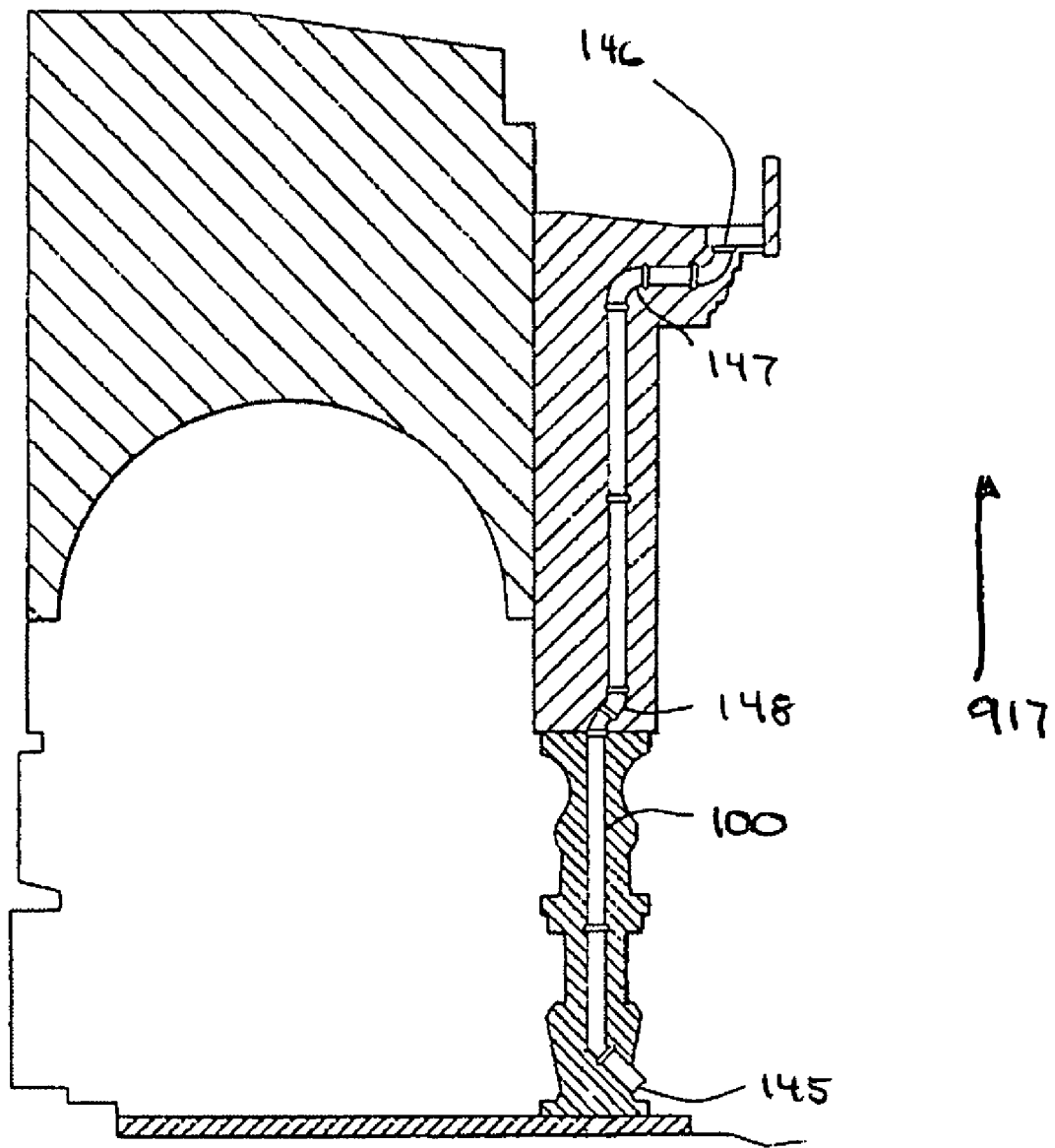
FIG. 1 illustrates a substantially vertically oriented pipe enclosed within a wall and having a top opening and a bottom opening.

While this invention is susceptible of embodiments in many different forms, there is shown in the drawings and will herein be described in detail embodiments of the invention with the understanding that the present disclosure is to be considered as an exemplification of the principles of the invention and these examples are not intended to limit the broad aspect of the invention. The above general description and the following detailed description are merely illustrative of the subject invention and additional modes, advantages and particulars of this invention will be readily suggested to those skilled in the art without departing from the spirit and scope of the invention.

The invention teaches a low pressure, safe and clean method of pipe lining. This can be contrasted with methods utilizing steam or heated fluids for the inflation and curing of the pipe repair material. The method and system is convenient for use inside office buildings or residences. The devices utilized in the system an electric controller, and electrically powered blowers and heaters.

FIG. 1 illustrates a cross sectional view of a substantially vertically oriented pipe or conduit or duct (hereinafter "vertical pipe" or "pipe") 100 that may be repaired by the method and system of the present invention. The illustrated pipe is enclosed within a wall or other structure. The vertical orientation is illustrated by the vector arrow 917. The pipe has a lower access port 145 and an upper access port 146. In the pipe illustrated, the pipe comprises a non linear segment 148 and an elbow segment 147. The pipe may have a circular shape with a radius. However the invention is not limited to that configuration.

The repair material is a flexible and substantially tubular shaped material with an open first end and second end. In one embodiment, the repair material is seamless. The deployed repair material forms a repair lining to at least a portion of the vertical pipe.

Figure 5:
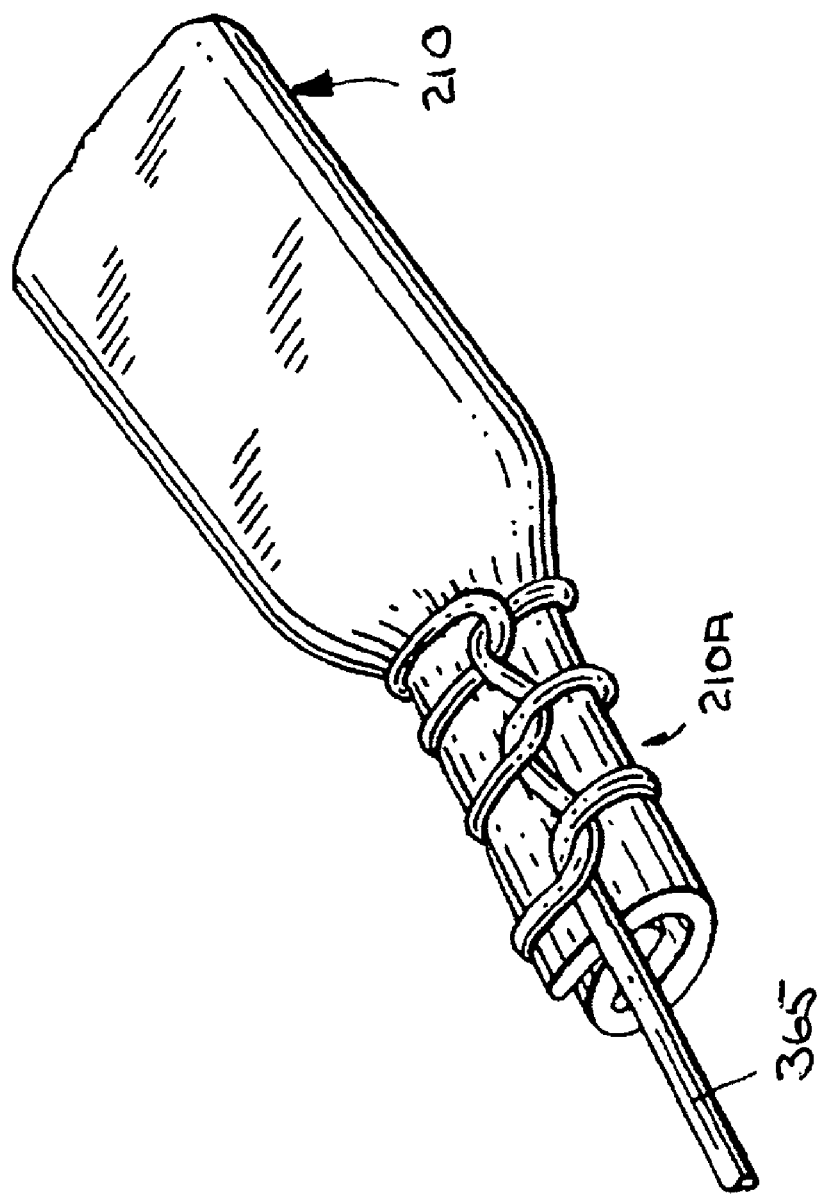
FIG. 5 illustrates a folded and collapsed end of the repair material attached to a tether.
Figure 6:
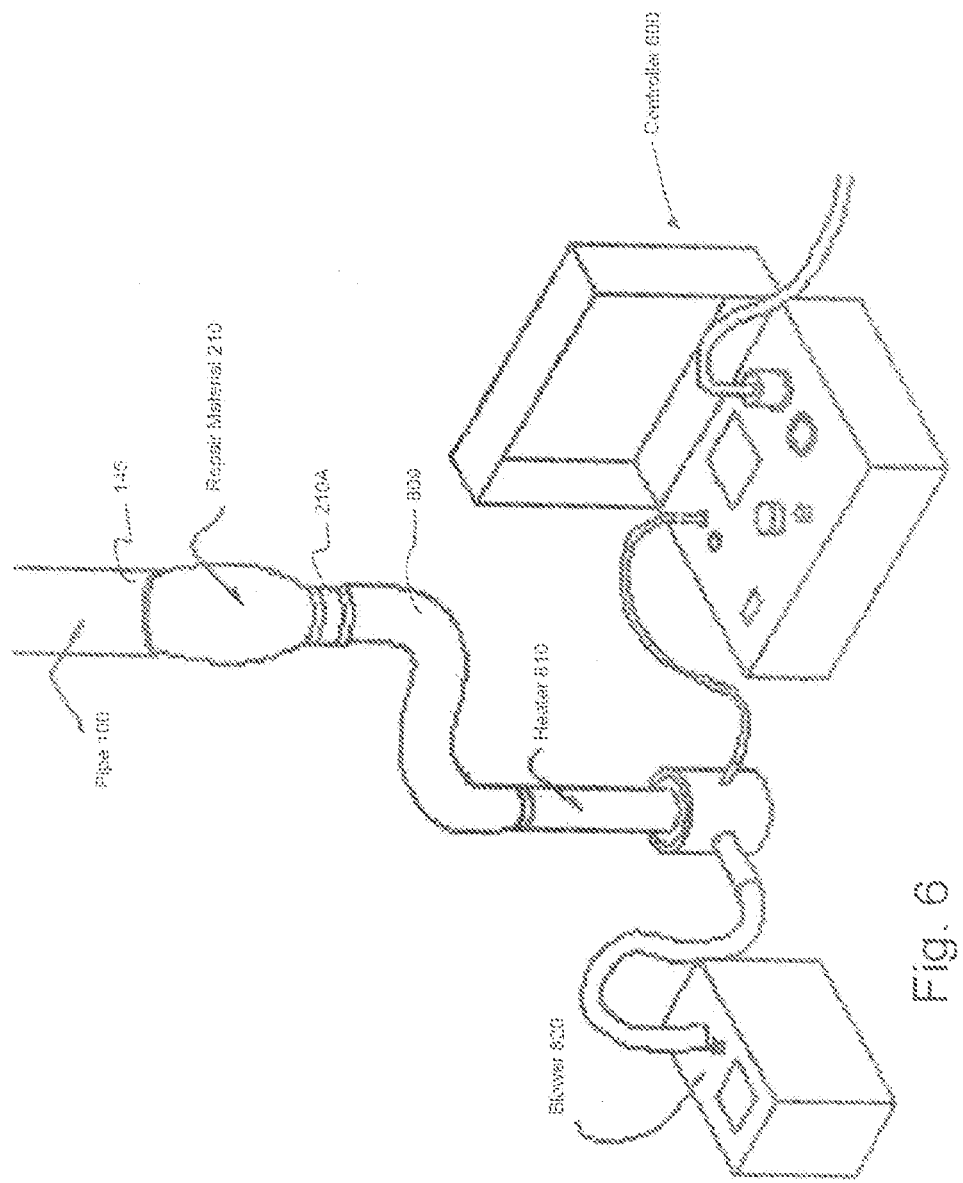
FIG. 6 illustrates devices used in curing and inflating the repair material and the relationship of the devices to the pipe.

In one embodiment, the repair material may be collapsed or folded along its longitudinal axis of orientation, thereby creating a reduced diameter to facilitate deployment within the vertical pipe. This folded repair material may be pulled into the pipe utilizing a tether attached to an end of the repair material. FIG. 5 illustrates a tether 365 tied to an end 210A of the collapsed and folded repair material 210. It will be appreciated that the otherwise open end of the repair material is closed or constricted by the tying of the tether. In one embodiment, the tether can be dropped from the upper access port of the pipe to the lower access port. By pulling the tether from the lower port, the repair material can be pulled (deployed) through the pipe.

With the repair material extending through the pipe, compressed air can be injected into the repair material to facilitate the resulting expansion of the repair material. Inflation may be facilitated by closing or constricting the opposing end of the repair material. The air source can be an air compressor or blower. The inflation causes the repair material to press in a radial direction to the inner pipe surface. The deployed and inflated repair material may now be heated.

The method and system of the invention also teaches an embodiment using a controller with a repair device, e.g., inflation canister, that can convey (deploy) material through a pipe. The device may also be used in conjunction with the repair material to press the repair material to the inner pipe wall surface. One device that may be utilized in such an embodiment is a bladder deployment canister ("inflation canister"), as well as associated air inflation and heating components, hoses, electric cables and power supplies. Examples of these devices or systems are describe fully in pending application Ser. No. 11/174,188 filed Jul. 1, 2005 and entitled "Portable Pipe Repair System with Electrically Heated Positioning Member", and a non provisional application filed Jan. 10, 2006 entitled "In Situ Pipe Repair Controller and System" assigned Ser. No. 11/328,618, both applications being incorporated by reference herein. The repair material now deployed into the pipe and pressed against the pipe wall can be then heated. The heat is used to cure or mold the repair material to the pipe surface.

Figure 2B:
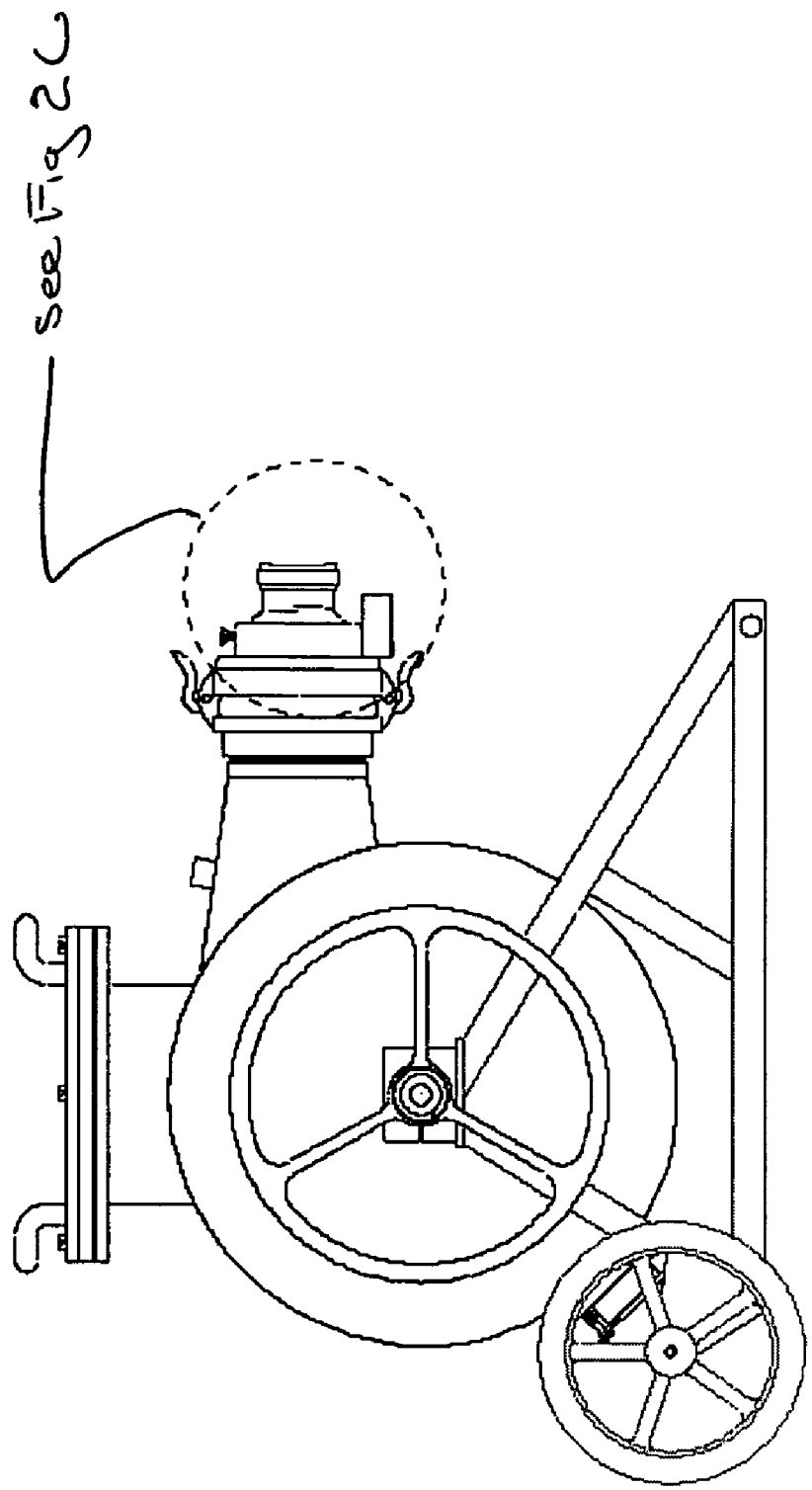
FIG. 2B illustrates the inflation canister showing the location of the detailed illustration in FIG. 2C and being one of the devices used in a system subject of the invention.
Figure 2C:
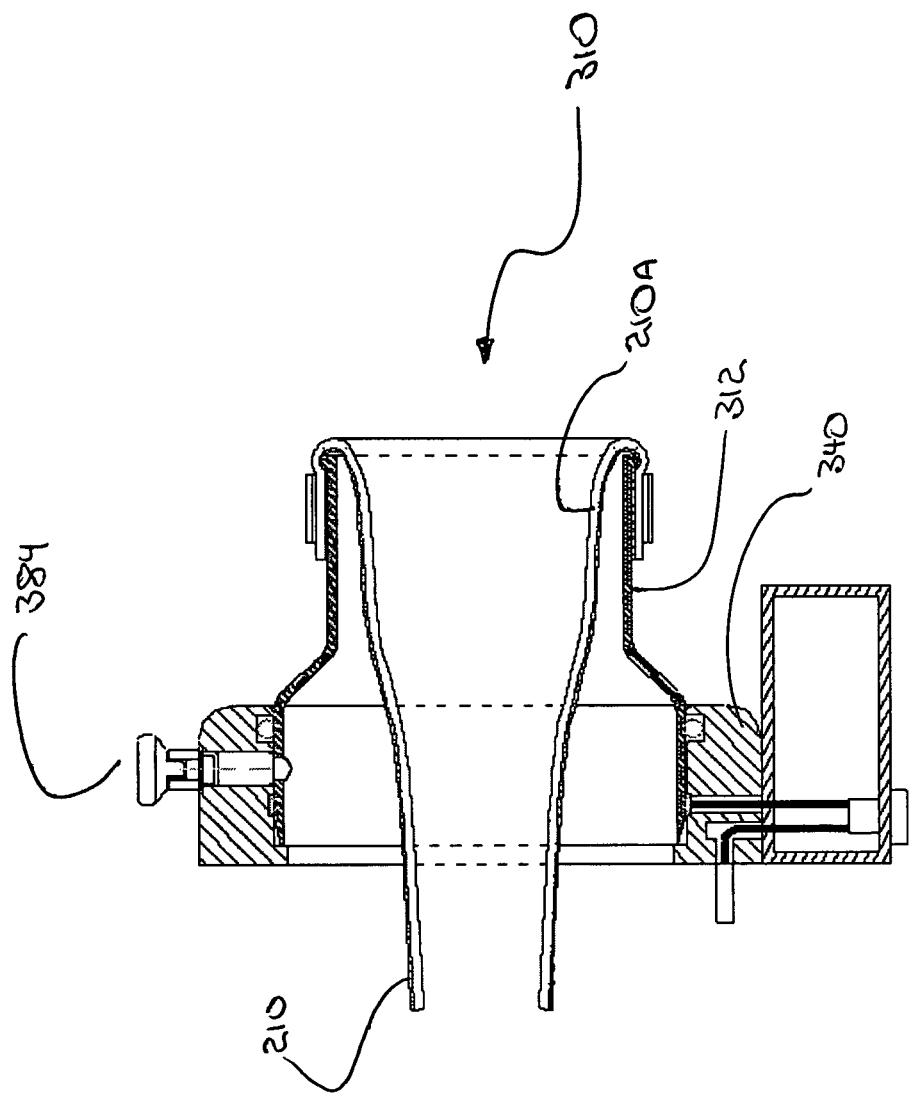
FIG. 2C illustrates a cross sectional view of the first end of the repair material attached to the deployment port of the inflation canister.

FIG. 2A illustrates a side view of the inflation canister taught in pending application Ser. No. 10/174,188 and used in one embodiment of the invention. A detail of the device is illustrated in FIG. 2C showing the attachment of one first end of the flexible and inflatable repair material to the inflation canister. In an embodiment taught by the present invention, the repair material may be deployed from the inflation canister 300 without use of an inflation bladder component. A first end 210A of the repair material 210 is attached directly to the deployment port 312 of the canister. When air pressure within the canister is increased, the repair material everts from the canister through the deployment annulus 310. Prior to the addition of the air pressure, the repair material is inverted and may be wound about a spool within the canister (not shown). The second end of the repair material (not shown) may be closed or constricted during eversion from the canister. This closing or constriction can be achieved with attachment of an optional tether as shown in FIG. 3F and FIG. 5.

Figure 2D:
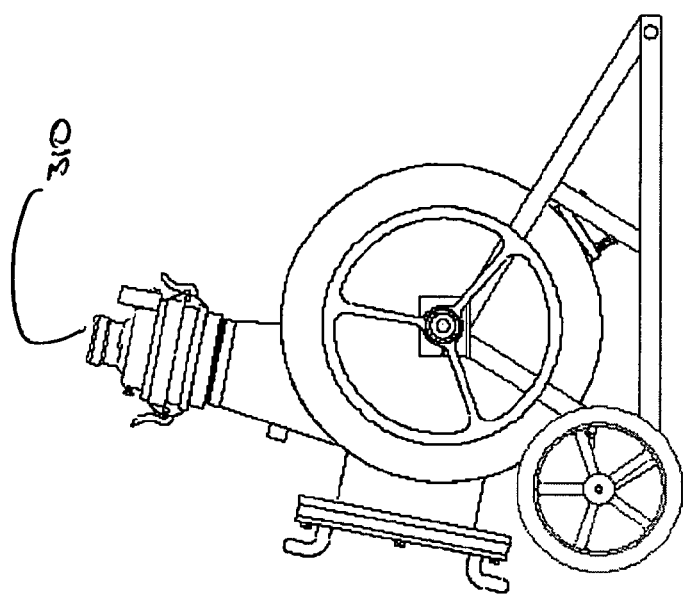
FIG. 2D illustrates the inflation canister used in one embodiment of the invention rotated to point the deployment port upward for installation of repair material in a vertical direction.

FIG. 2D illustrates the inflation canister used in one embodiment of the invention rotated to point the deployment port upward for installation of liner material in a vertical direction.

FIGS. 3A, 3B and 3C sequentially illustrate the eversion of the repair material 210 from the inflation canister 300 through the deployment port 312. The direction of eversion is shown by the vector arrow 916.

Figure 3D:
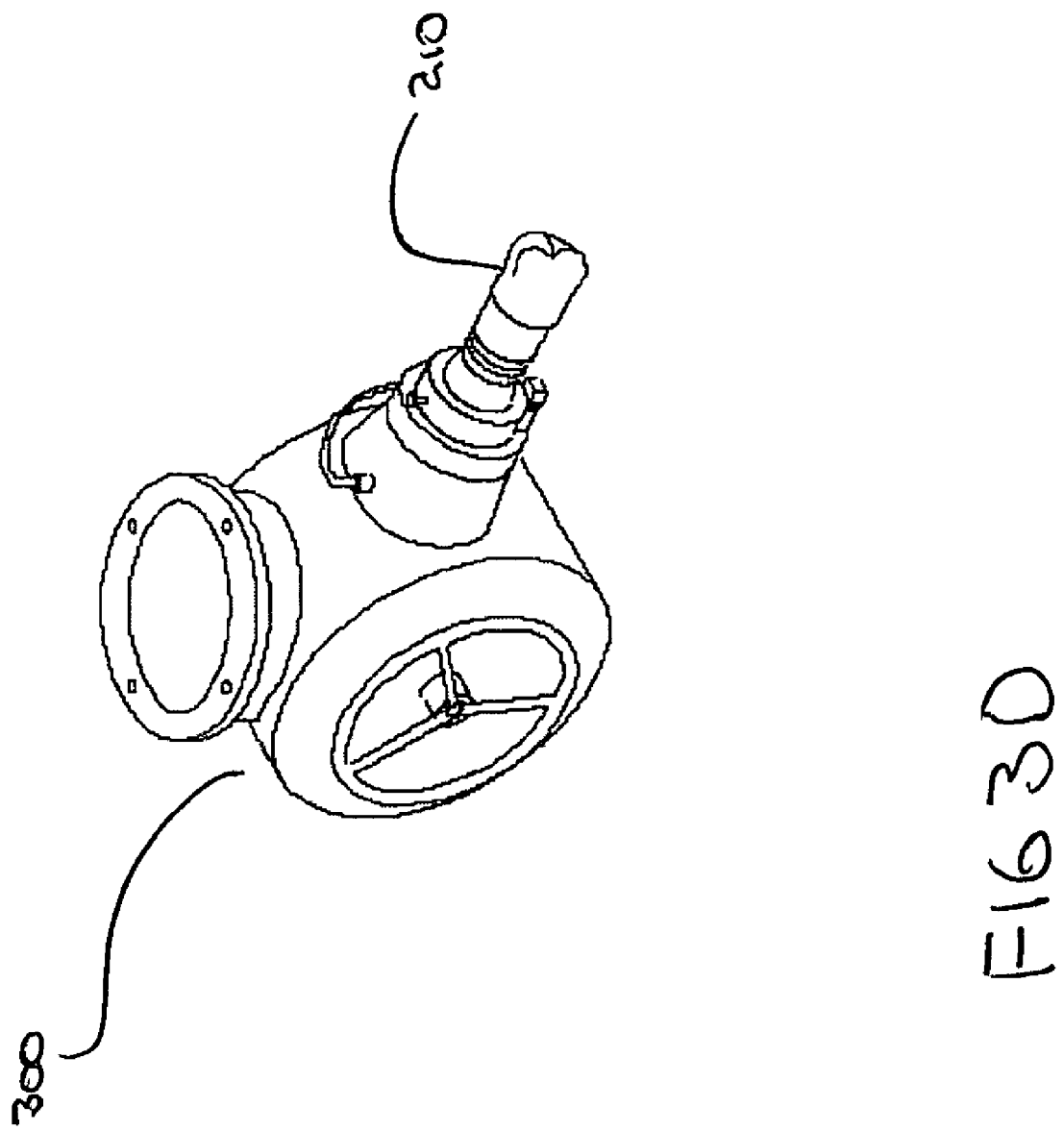
FIG. 3D is a perspective view of the repair material everting from the deployment port of the inflation canister.
Figure 3F:
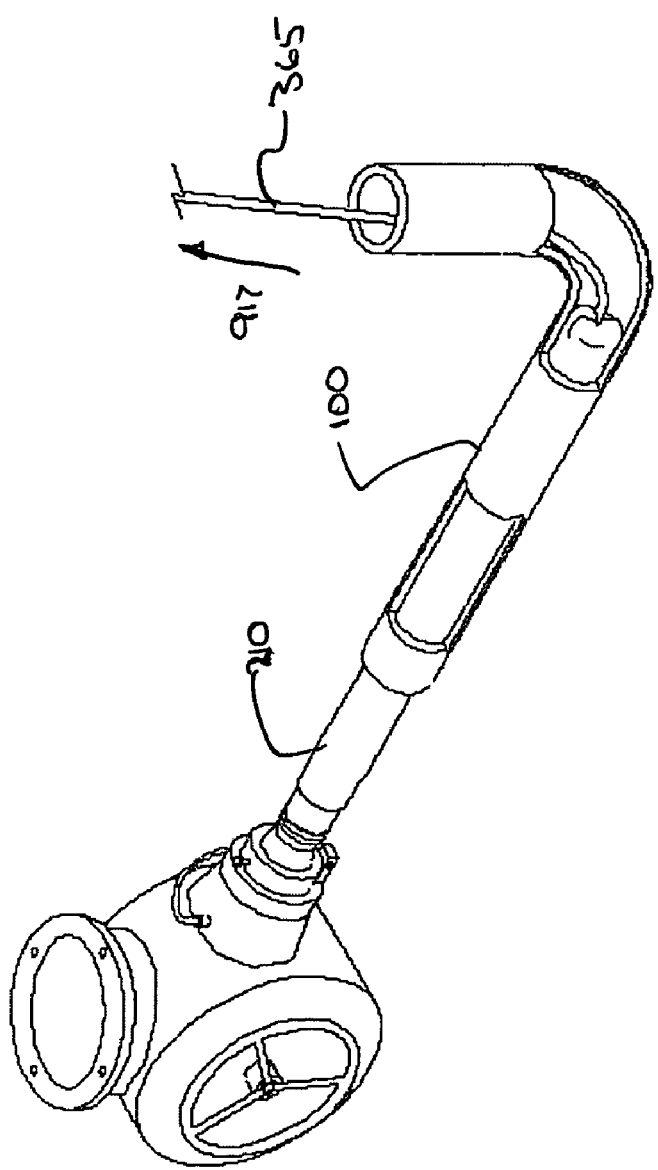
FIG. 3F is a further perspective view of the repair material everting around a pipe bend or elbow and proceeding vertically. Also illustrated is an optional tether component attached to a second end of the repair material and used to assist the deployment of the repair material through the pipe.

FIG. 3D is a perspective view of the repair material 210 everting from the deployment port 312 of the inflation canister 300. FIG. 3E is a perspective view of the repair material everting from the inflation canister and into a pipe 100. FIG. 3F is a further perspective view of the repair material everting around a pipe bend or elbow and proceeding vertically. Also illustrated is an optional tether 365 component attached to an end of the repair material and used to assist the deployment of the repair material through the pipe. The tether may be pulled from the upper pipe access port.

FIG. 4 illustrates a cross sectional view of one embodiment of repair material 210 and pipe wall 100. The relative thickness of the repair material to the pipe may be exaggerated for clarity of illustration. The repair material illustrated comprises two layers 211, 212. The layer 211 proximate to the pipe may comprise a loop knit or braided fibers impregnated with a thermal responsive resin. The resin may be either thermal plastic or thermal setting. In another embodiment, the fibers may be comprised of thermal plastic material that will mold to the inside of the pipe surface when heated. The second layer 212 may be an extruded polyurethane film or a coating that is substantially air impermeable. This coating can facilitate the expansion of the repair material the radial direction. Other embodiments of repair material that may be utilized with the present invention are disclosed in co-pending application Ser. No. 10/258,294 entitled "Method of Forming Repair Material For Conduit Interface Area and For Repairing a Non-Linear Conduit With a Fiber Repair Material", filed Sep. 5, 2003 and which is incorporated by reference herein.

FIG. 5 illustrates the system utilized in the inflation and heat curing of the repair material. Illustrated is the lower access port 145 of a pipe 100. Deployed into the pipe is the repair material 210. The end 210A of the repair material is connected to an optional flexible air tube 809 that is attached to an air heater such as an Omega model AHF-12240. Air is blown through the heater 810 using an air blower 820 such as an Ametek BLDC bypass blower. Also illustrated is a controller 600 such as taught by the inventor's co-pending application filed Jan. 10, 2006. It will be appreciated that the illustrated end of the repair material may have been connected (in an earlier step) to the deployment port of an inflation canister as illustrated in FIG. 2C.

One embodiment of the present invention for lining a substantially vertically oriented pipe with a repair material comprises the following steps.

1. A tubular shaped liner material ("repair material") having a first end and a second end is pre-impregnated with a thermo setting resin. An example of the resin is a medium viscosity thixotropic epoxy resin system such as CPD 3610 resin used in conjunction with an epoxy hardener, CPD 3838, from Epoxical, Inc. This system exhibits extended working life of up to 180 minutes while allowing cure acceleration with the addition of heat. Silica fillers can be added to further increase viscosity and prevent excessive resin migration or undesired movement. An example of the liner material is a polyester loop knit material coated with an extruded polyurethane film and fabricated into a tubular configuration corresponding with the internal diameter of a pipe. This textile construction is capable of holding an ample amount of the mixed resin while demonstrating excellent flexibility and the ability to conform to the internal geometry of the pipe. The polyurethane coating both retains the resin and provides an air impermeable barrier to allow the repair material to be pressurized with air. Another embodiment provides a resin carrying material comprised of a light-weight, open cell foam coated with an extruded polyurethane film and fabricated into a tubular configuration. In a further embodiment, the foam and textile materials may be combined to further enhance properties.

2. A first open end of the repair material is attached to the access port of a closeable container, for example an inflation canister. The second liner end may be closed. The second end may also be attached by a tether device also attached to a spool within the canister. The bladder may be inverted (turned inside out) and introduced into the canister and may be wound on a spool within the canister. By eversion, the liner is turned right side out. The canister access port is placed proximate to an access point or port (e.g., a pipe clean out, etc.) at the lower end of a substantially vertically oriented pipe. For example, the access port of the inflation canister could be placed proximate to the lower pipe opening 145 illustrated in FIG. 1. Using a fluid pressure introduced into the canister, the liner is everted out of the canister and into the pipe. The continuous introduction of air causes the liner to continue to evert and extend through the pipe. This process is illustrated in FIGS. 3D, 3E and 3F.

3. This process continues until the everting repair material reaches the top opening of the pipe. For example the top opening 146 of the pipe 100 illustrated in FIG. 1.

4. The repair material may continue everting until the second end of the repair material emerges from the pipe. The second end may be closed or otherwise constricted to facilitate a positive pressure being maintained within the everted repair material now extending through the pipe. The positive air pressure causes the repair material to press against the inside wall surface of the pipe.

5. The positive pressure can be maintained by continuous addition of air into the first end of the repair material.

6. The first end may be removed from the inflation canister and attached to a heated air supply source. Alternatively, the air flowing from the inflation canister may be heated. The flow of hot air continues from the lower first end of the repair material through the length of the repair material now lining the pipe and through the second end of the repair material.

7. In another embodiment, pre-impregnated liner is pulled into the substantially vertically oriented pipe, either from an upper level access point or upward from a lower level access point.

8. The first end of the liner is at the lower end of the pipe to be repaired. The second end is at an upper level access point of the pipe.

Figure 7:
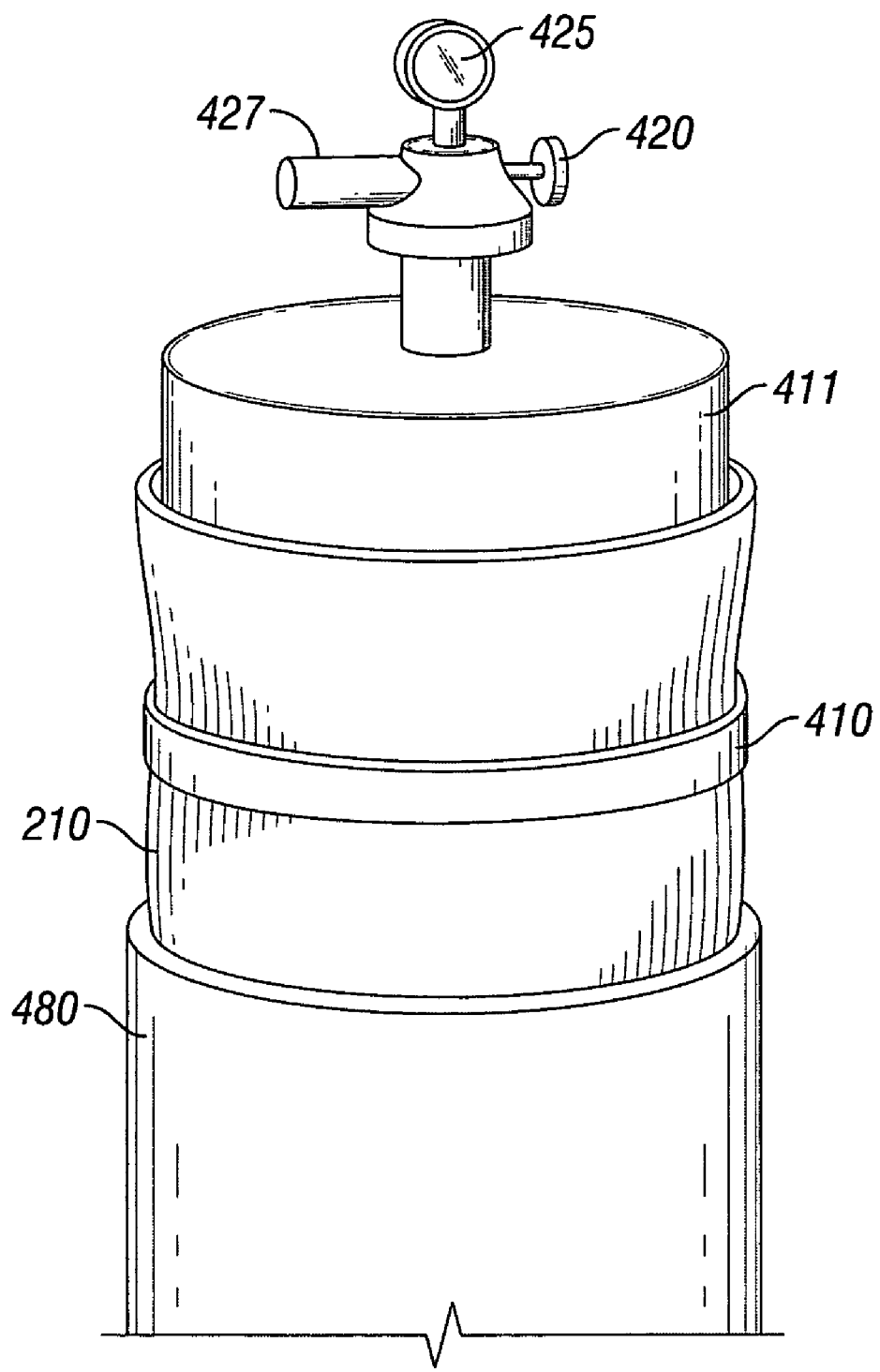
FIG. 7 illustrates one embodiment of a pressure regulator valve placed at the end of the repair material.

9. The second end is air closeable. One example is to simply draw the lining material down on itself with a mechanical closure such as a cable tie, wire or twine. A sealing material such as a water activated, urethane may also be incorporated into this closure to insure a seal. Another example of the closing device is machined aluminum tube with one closed end. The machined tube may contain one or more sealing grooves recessed circumferentially into the outer surface of the tube to accept a mechanical clamping mechanism. The sealed second end may also contain one or more ports to allow regulation of the fluid pressure within the lining material. This can be accomplished with an air regulator valve as shown in FIG. 7. The outside diameter of the closing device is of a dimension approximate to the liner internal diameter. The liner diameter may be approximately 4.10 inches when the internal pipe diameter is approximately 5.00 inches. In one embodiment, the length of the pipe(s) being repaired is approximately 90 feet. Additional diameters and lengths can be accommodated by altering the construction of the repair materials. The flexibility of the lining material may also permit one size (diameter) liner to operate in various conduit diameters (or in the case of non-circular conduits, equivalent circumference).

10. For the heat curing or molding step, the first end of the pipe is attached to an air blower device, such as an air blower or compressor. The air blower used may be a 3 stage, bypass blower capable of 40 cubic feet per minute flow rate and 3 pounds per square inch of air pressure. A suitable blower is a BLDC Bypass Blower from Ametek. With the second end substantially closed, the action of the increased air pressure inflates the liner (but it is not required that the liner be deformed). The inflated liner presses against the sides of the pipe being repaired.

11. The air inflating to the liner may be heated during the inflation step or the heating may be performed in a separate step after the liner is in position.

12. Heated air (from the air heater) is inserted into the inflated repair material at the first open end. The second end of the liner may be controllably opened to permit air flow from the first (lower) end to the second (upper) end of the repair material. In one embodiment, the second end of the liner may be controllably opened with an air pressure regulating valve. An example of such a valve is illustrated in FIG. 7. The liner 210 is shown extending from the second pipe end 480. The regulator is held by a circular clamp 410 holding the cap 411 containing an air outlet controlled by a valve 420, a pressure gauge 425 and air exhaust 427. A suitable air heating device is a high flow, low pressure, tubular air heater with an internal, cross frame heating element designed to minimize resistance to air flow. An example is the Omega AHF-12240 heater. This air heater has a practical operating range of 200 CFM with temperatures up to 600° F. Outlet temperatures can be controlled by varying the voltage to the heating element as well as altering the flow rate. Additional control can be achieved by changing the length of the heating element or by adding additional elements in series. The construction of the heating element may be nickel-chrome wire or carbon fiber.

13. A positive pressure, utilizing an air blower or air compressor) is maintained within the inflated liner such that the liner remains pressed against the inside pipe wall. The estimated fluid pressure is 2.5 PSI. The air temperature entering the liner is approximately 300 degrees F. The heated air is inserted into the pipe for approximately 4 hours to complete the cure of the thermally responsive resin. It will be appreciated that the air flow will be adjusted for differing diameters of pipe.

While specific embodiments have been illustrated and described, numerous modifications are possible without departing from the spirit of the invention, and the scope of protection is only limited by the scope of the accompanying claims.

What is claimed is:

1. A vertical pipe lining method comprising:
   a. positioning a tubular shaped repair material having a first end and a second end by pulling the repair material into a substantially vertical oriented pipe from a first pipe opening through the pipe to a second pipe opening where one pipe opening is a bottom opening relative to the other top opening and the repair material comprises a multi-layered lining of a first outer layer comprising a thermally responsive component and an air impermeable second inner layer;
   b. inflating the repair material by adding air to the repair material to press the first outer layer of the repair material against the pipe;
   c. conveying heated air through the inflated repair material from the bottom opening to the top opening to cure or mold a thermal responsive component of the repair material to the pipe; and
   d. constricting the second end of the repair material by placing an air pressure regulating valve and the second end of the repair material traverses from the first pipe end to the upper second pipe end.

2. The method of claim 1 wherein the heating thermal responsive component is cured within a range of 200 to 400 degrees F.

3. The method of claim 1 wherein the air is added to the interior of the repair material without use of an inflation bladder or inflation device.

4. A substantially vertical pipe lining method comprising:
   a. placing an inflation canister proximate to an opening of the pipe wherein the canister comprises a deployment port through which repair material can be unwound from an internal canister spool as it is deployed by air pressure, a first end of the repair material attached to the deployment port, a closed or constricted second end of the repair material within the canister wherein the second end is attached to a tether extending from the deployment port;
   b. pressurizing the canister with air;
   c. everting the repair material from the canister into the pipe opening;
   d. using the tether to guide the everting repair material in the pipe;
   e. continuing the eversion process until the repair material emerges from the second pipe opening;
   f. modifying the second end of the repair material to install an air pressure regulator valve; and
   g. conveying heated air through the inflated repair material from the bottom opening to the top opening to cure or mold a thermal responsive component of the repair material to the pipe.

5. A building or residence substantially vertical pipe repair system comprising:
   a. accessing two openings of a substantially vertical pipe wherein one first pipe opening is above the other second pipe opening;
   b. inserting an air inflatable repair material thorough one pipe opening so that the repair material extends from the first pipe opening to the second pipe opening;
   c. attaching an air blower and heater to one first end of the repair material to inflate the repair material and cure or mold thermal responsive components within the repair material; and
   d. attaching an air pressure regulating valve to a second end of the repair material to control the air pressure within the repair material.

6. The system of claim 5 further comprising constricting a second end of the repair material.

7. The system of claim 6 further comprising constricting the second end of the repair material by attaching a tube with a closed end to the end of the repair material.

8. The system of claim 6 further comprising constricting the second end of the repair material by attaching a component with a smaller opening for the flow of air.

* * * * *